United States Patent [19]

Klemola

[11] Patent Number: 4,591,374
[45] Date of Patent: May 27, 1986

[54] APPARATUS FOR EQUALIZING THE TEMPERATURE OF CONVEYOR ROLLS IN A GLASS-TEMPERING FURNACE

[75] Inventor: Jorma J. Klemola, Nattari, Finland

[73] Assignee: O/Y Kyro A/B Tamglass, Finland

[21] Appl. No.: 735,764

[22] Filed: May 20, 1985

[30] Foreign Application Priority Data

May 24, 1984 [FI] Finland ................................ 842072

[51] Int. Cl.⁴ ............................................ C03B 23/02
[52] U.S. Cl. ....................................... 65/350; 65/111; 65/118; 65/356; 432/148; 432/194; 432/226; 432/249
[58] Field of Search .................. 65/350, 355; 432/148, 432/226, 249, 194; 65/111, 118, 356

[56] References Cited

U.S. PATENT DOCUMENTS

| | | | |
|---|---|---|---|
| 1,858,678 | 5/1932 | McVey et al. | 432/249 X |
| 1,957,132 | 5/1934 | Callard | 432/148 X |
| 2,725,680 | 12/1955 | Baker | 65/350 |
| 3,792,993 | 2/1974 | Artama et al. | 65/350 X |
| 3,862,828 | 1/1975 | Ritter, Jr. et al. | 65/356 X |
| 3,884,667 | 5/1975 | Schraven | 65/350 |
| 4,092,143 | 5/1978 | Groot et al. | 65/351 |

FOREIGN PATENT DOCUMENTS

| | | |
|---|---|---|
| 107566 | 10/1983 | European Pat. Off. . |
| 718248 | 2/1942 | Fed. Rep. of Germany . |
| 766602 | 4/1954 | Fed. Rep. of Germany . |
| 135774 | 5/1952 | Sweden . |
| 472516 | 12/1935 | United Kingdom . |
| 475181 | 2/1936 | United Kingdom . |

Primary Examiner—Arthur Kellogg
Attorney, Agent, or Firm—Burns, Doane, Swecker & Mathis

[57] ABSTRACT

The invention relates to an apparatus for equalizing the temperature of conveyor rolls in a glass-tempering furnace, said furnace comprising a thermally insulated housing (1) confining a heating chamber (8), conveyor rolls (4), extending horizontally between the side walls of chamber (8) and lying one after the other in the lengthwise direction of the chamber, heating resistors (5 and 6) in the chamber above and below the array of conveyor rolls, as well as means for driving the conveyor rolls unidirectionally during a first cycle and reciprocally during a second cycle. Since the reciprocating movement means that a glass sheet remains longer in contact with the midsection rolls, these rolls cool more rapidly. In order to equalize the temperature of the rolls, the end sections of the furnace are provided with screen plates (7) mounted between heating resistors (6) below the array of conveyor rolls and the rolls (4) themselves.

6 Claims, 1 Drawing Figure

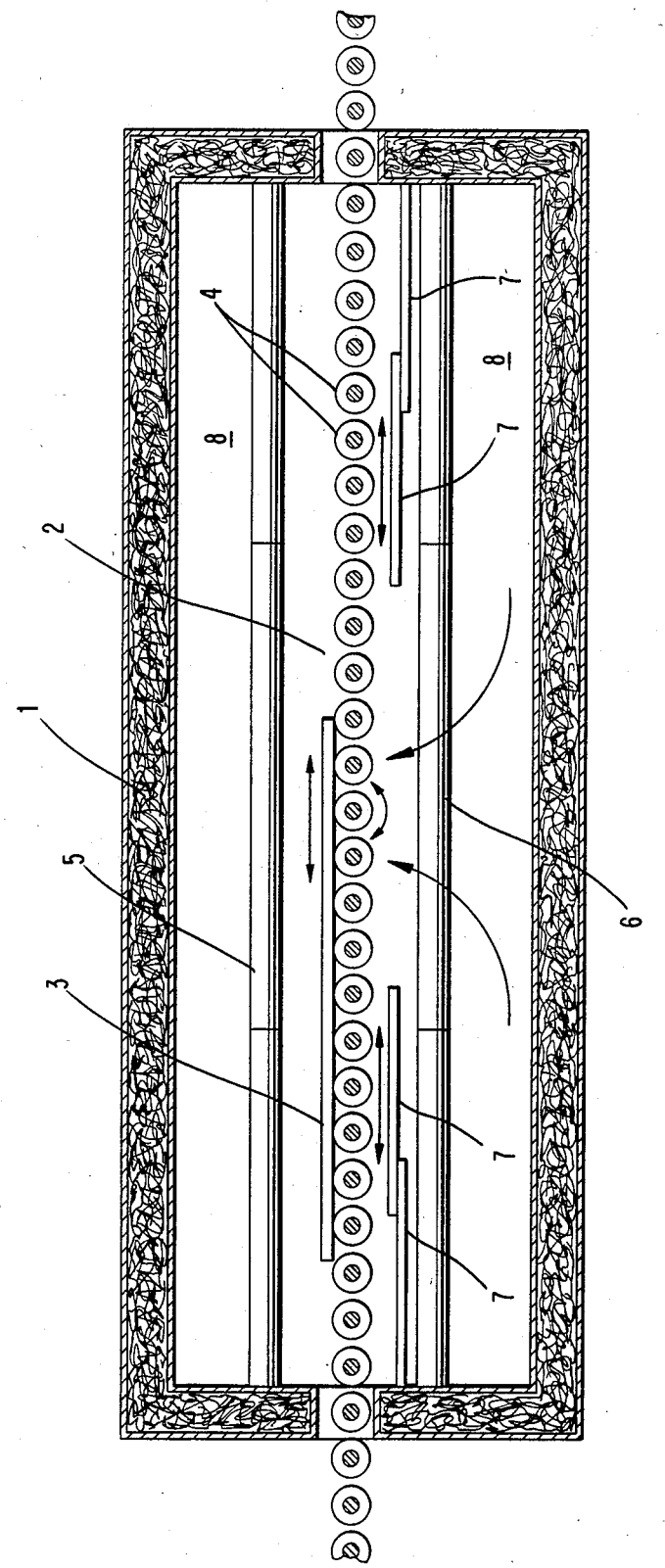

APPARATUS FOR EQUALIZING THE TEMPERATURE OF CONVEYOR ROLLS IN A GLASS-TEMPERING FURNACE

The present invention relates to an apparatus for equalizing the temperature of conveyor rolls in a glass-tempering furnace, said furnace comprising a thermally insulated housing that confines a heating chamber, conveyor rolls extending horizontally between the side walls of said chamber and lying one after another in the lengthwise direction of the chamber, heating resistors in the chamber above and below the array of conveyor rolls, as well as means for driving the conveyor rolls unidirectionally during a first cycle and reciprocally during a second cycle.

This type of glass-tempering furnace has been described in the Applicant's GB Patent specification No. 2 059 941.

When, by rotating conveyor rolls back and forth, glass sheets are oscillated in a furnace, a glass sheet will be in more contact with the midsection rolls than with the endsection rolls with a result that the midsection rolls cool further. As a consequence, also the temperature of glass to be heated (glass sheets to be heated) in the conveying direction will be correspondingly cooler in the middle of a load of glass, which is a highly undesired phenomenon in terms of a glass-tempering process. Unequal distribution of of temperature leads to deterioration of the surface quality and optical properties of glass sheets, adds radically to the glass sheets' susceptibility to breakage in the tempering operation after the heating and is also a partial factor to the possibility of especially thick glass sheets (over 8 mm) to shatter already in the furnace. Attempts have been made to resolve the problem by increasing the temperature of lower resistors within the midsection of a furnace. However, heat transmits e.g. with air circulation to the end rolls as well and, thus, the temperatrue of the midsection rolls would have to be substantially increased in order to maintain the rolls at equal temperature. With this system, it could be possible to create relatively equal temperature conditions for a given glass thickness and glass sheet of a given length but, with varying glass thicknesses and lengths, the elevated temperature of the lower midsection resistors would also have to vary accordingly. This would slow down the operation of a furnace considerably since, with heating effects being re-adjusted, the acquirement of new temperature balance requires a certain downtime. In addition, such a temperature control system would be very complicated and difficult to control.

In this invention, the problem has been resolved by mounting screen plates in the end sections of a furnace between the heating resistors below the array of conveyor rolls and the actual rolls. Such screen plates are preferably made of thin heat resisting steel sheet, having a thermal radiation coefficient of more than 0.4 and extending across the width of a furnace. In the first place, the screen plates reduce the radiation effect of lower resistors in the ends of a furnace. Secondly, the screen plates increase the underlying convective heat effect in the midsection of a furnace while reducing the convective effect in the ends of a furnace.

Another advantage gained is that, on their part, the screen plates protect the heating resistors from eventually broken glass.

The screen plates can be made adjustable so as to cover a smaller or larger area of the ends of a furnace. By adjusting the screen plates, a furnace can be adapted quickly and without downtimes to glass sheets of varying thickness and length.

The invention will now be illustrated with reference made to the accompanying drawing, showing a longitudinal vertical section of a glass-tempering furnace provided with an apparatus of the invention.

A thermally insulated housing 1 confines a heating chamber 8. Horizontal conveyor rolls are journalled to the furnace side walls and lie successively and slightly spaced from each other in the lengthwise direction of the chamber. A glass sheet 3 can be carried on a conveyor table made up by rolls 4.

Outside and on one side of the furnace the ends of rolls 4 are fitted with pulleys or sprockets, driven by a motor through a belt or chain. Since the drive mechanism is not an object of this invention and an example of a drive mechanism has been disclosed in the cited GB Patent specification No. 2 059 941, such drive mechanism shall not be dealt with in detail in this application. It should be noted, however, that by means of such drive mechanism the conveyor rolls 4 are driven unidirectionally during a first cycle for carrying glass sheets 3 into the furnace and from the furnace to the following cooling section and, during a second cycle, said rolls 4 are driven back and forth in order to hold the glass sheets 3 in the furnace for a sufficiently long heating cycle while preventing the sagging of a softening glass sheet between the rolls 4 and avoiding the surface impressions caused by rolls 4.

A reciprocating glass sheet 3 remains for a longer time in contact with the midsection rolls than with those in the end sections. This coils the midsection rolls more rapidly than the endsection rolls, resulting in an unequal thermal distribution and thermal stresses in a glass sheet 3. To eliminate this, the furnace end section is fitted with screen plates 7 mounted between the underlying heating resistors 6 and the rolls 4. Said plates 7 extend preferably across the entire width of the furnace and extend from each end of the furnace towards the centre e.g. through ⅓ of the furnace length. Screen plates 7 are made of thin heat resisting steel sheet, whose radiation coefficient is over 0.4 in order to provide necessary heating effect also for the end rolls 4.

In the first place, said screen plates 7 reduce the radiation heat effect of lower resistors 6 at each end of the furnace. Secondly, they increase the underlying convective heat effect in the midsection of a furnace. At the same time, such screen plates 7 reduce convection effect at the ends of a furnace. By virtue of this, the conveyor rolls can be maintained at substantially constant temperature over the entire length of a furnace despite the fact the midsection rolls transmit more heat to glass sheets 3. Even in this case, it is necessary or appropriate to provide the midsection resistors 6 with more heating effect than at the ends. Thus, the purpose of screen plates is to make the system more stable, which is achieved because a difference smaller than before is needed between the heating effects of midsections and endsections.

It is preferable to make the screen plates 7 adjustable in their area so as to work out beforehand a table of adjusted or set positions corresponding to predetermined thicknesses and lengths of glass sheets.

In order to obtain proper screening, the screen plates can also be provided with holes. A desired screening distribution can be obtained by having a correspondingly different hole distribution in various parts of a screen plate. For example, the size or density of holes can be increased towards the midsection of a furnace. Thus, the transmission of heating effect to the rolls can quite accurately comply with the cooling effect transmitted from glass to the rolls in various parts of the length of a furnace.

I claim:

1. An apparatus for equalizing the temperature of conveyor rolls in a glass-tempering furnace, said furnace comprising a thermally insulated housing (1) confining a heating chamber (8), conveyor rolls (4), extending horizontally between the side walls of said chamber (8) and lying successively in the lengthwise direction of the chamber, heating resistors (5 and 6) in the chamber above and below the array of conveyor rolls, as well as means for driving the conveyor rolls unidirectionally during a first cycle and in reciprocating fashion during a second cycle, characterized in that between the heating resistors (6) below the array of conveyor rolls and the actual rolls (4) are mounted screen plates (7) at the end sections of the furnace.

2. An apparatus as set forth in claim 1, characterized in that said screen plates (7) are made of thin heat resisting steel sheet, having a radiation coefficient of more than 0,4 and extending across the entire width of the furnace.

3. An apparatus as set forth in claim 1, characterized in that said screen plates (7) extend from each end of the furnace towards the centre through approximately ⅓ of the length of the furnace.

4. An apparatus as set forth in claim 1 characterized in that said screen plates (7) are made adjustable in their surface area.

5. An apparatus as set forth in claim 1 characterized in that the screen plates are perforated.

6. An apparatus as set forth in claim 5, characterized in that the distribution of perforations (i.e. the density and/or size of perforations) varies in the longitudinal direction of the furnace.

* * * * *